Jan. 7, 1969  H. A. WANDERMAN  3,419,970

MODEL STRUCTURAL SYSTEM

Filed Feb. 21, 1966

INVENTOR.
HERBERT A. WANDERMAN
BY
William S. Everett
AGENT

_United States Patent Office_

3,419,970
Patented Jan. 7, 1969

3,419,970
MODEL STRUCTURAL SYSTEM
Herbert A. Wanderman, Alhambra, Calif., assignor to Engineering Model Associates, Los Angeles, Calif., a co-partnership
Filed Feb. 21, 1966, Ser. No. 529,100
U.S. Cl. 35—16                9 Claims
Int. Cl. G09b *19/00;* A63h *33/10*

ABSTRACT OF THE DISCLOSURE

This invention provides a system for providing engineering models hvaing realistic features and removable elements for facilitating the study, design and display of a project or structure. Models of multi-storied structures may be assembled using the inventive system, any one or more floor levels being readily exposed in full or in part by removal of the corresponding portion overhead as a unit or in part to permit close inspection and observation as desired. Such removal permits reporting construction progress photographically at periodic intervals.

---

This invention relates to engineering models and more particularly to a system for providing an engineering model having realistic and removable features for facilitating the study, design, and display of a project or structure.

Models, both scaled and otherwise, have long been used in many fields of technology for a variety of purposes. Until recently, however, serious consideration was never adequately given to models as an engineering tool. The modern methods and practices of the present are quite the contrary. This is especially true in those areas concerned with the study, design and construction of highly expensive and complex plants and projects. In fact, rare is the project of such proportions today that is not first accurately detailed in model form long before the ground breaking ceremonies.

Though not always true for the hobbyist, an engineering model is accurately built to scale. As such, the engineering model is capable of transmitting a large quantity of information at a slight glance on the part of the viewer. Thus, no longer is it necessary for each individual concerned or responsible for certain aspects of the project to become thoroughly acquainted with a myriad of drawings as was the case before. Stated differently, the engineering model is in fact a three-dimensional drawing which may replace several conventional drawings and with which any errors over-looked on such drawings will become clearly noticeable on the model. Thus, the engineering model must not only be accurately constructed but must also be realistically detailed in order to quickly spot such errors or interfering components and eliminate the necessarily costly work-charges after construction has commenced. Characteristic of a structural model built in accordance with the present invention is this feature realistically communicating to the viewer sufficient information to adequately visualize the overall structural configuration of the actual project.

Since an accurately constructed and realistically detailed engineering model can be readily photographed and such photographs used to supplement the drawings, it is also a desired feature that certain parts or floor levels or sections be easily detached. This enables the photographers to get a better view of the equipment installed or to be installed. This removable feature also helps the student operator or maintenance apprentice in his training since the engineering model can be used as a training aid both before and after project completion. The same applies where subsequent modifications are to be made. With the present invention, the engineering model can not only be realistically detailed but also removably connected for enhanced viewing individually or photographically and for shipment when and where desired at anytime, even long after the actual construction is completed.

Briefly, the system to be described comprises a square tubular member of various size color coded to portray a fireproof column, a similar variety of structural shapes of a different color to represent a bare steel column, a gusset-like member to which a variety of different inserts may be provided, and a base or base board to which the columns may be removably attached and similarly attached to each other, successively if desired.

In accordance with the invention, there is provided in a system for structural models, the combination comprising base means for the structure; a first plurality of upstanding, elongated structural members mounted to the base means; a second plurality of upstanding, elongated structural members including bracing means for interconnecting the members of the second plurality in spaced apart relationship; and connecting means for removably receiving the members of the second plurality in supporting disposition on the members of the first plurality, the connecting means being secured to the members of the first plurality at the upper end thereof and including a gusset-like upper portion for engageably contacting certain portions of the members of the second plurality at the lower end thereof in the removable relationship.

In another aspect of the invention, additional means for removably attaching a structural column having web portions to the base and longitudinally to successive columns of the same or smaller size is provided.

It is therefore the primary objective and purpose of the invention to provide an improved model structural system for design, study and displaying purposes.

It is another object of the invention to provide a structural system for engineering models utilizing a realistic connecting means for removably attaching a preselected level from its adjoining level.

It is still another object of the invention to provide a structural system for engineering models of the type described wherein a gusset-like connecting member is provided for removably supporting certain levels of a model structure.

It is yet another object of the invention to provide a structural system for engineering models of the type described utilizing a gusset-like member for removably connecting the upstanding structural members of a model structure.

Another object of the invention is to provide a structural system for engineering models of the type described wherein a reducing connecting member having a gusset-like configuration is provided for removably supporting a smaller column on a larger column.

Still another object of the invention is to provide a structural system for engineering models of the type described wherein realistic structural steel columns and reinforced columns are provided and removably interconnected.

These and other objects, features and advantages of the invention will appear and be brought out more fully in the following specification reference being had to the accompanying drawing wherein.

Figure 1:
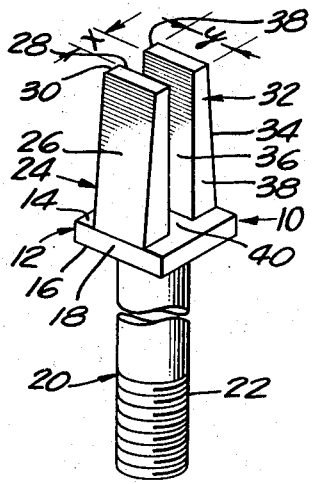
FIGURE 1 is a perspective view of one type of connecting means according to the invention.

Referring to the drawing, in FIGURE 1 a reference numeral 10 depicts one form or means for interconnecting supporting columns of a structural model to be described. The connecting means 10 includes a base plate portion or base plate 12 having an upper surface 14, a lower surface 16 and preferrably four sided surfaces 18.

An extension 20, which may be a shaft having a threaded portion 22 for attaching to a base not shown, extends downwardly from the lower surface 16. Extending upwardly from the upper surface 14 as seen in FIGURE 1 is a gusset-like rib 24 having an inclined outer surface 26, a planar inner surface 28, and oppositely disposed side surfaces 30 and 32 extending between the surfaces 26 and 28. Also extending upwardly from the upper surface 14 is another gusset-like rib 32 having an outer inclined surface 34, an inner planar surface 36, and adjoining side surfaces 38. The planar surface 36 also parallels the planar surface 28 with both surfaces 28 and 36 each being preferrably offset by a predetermined amount from the center of the base plate 12 to provide a region or space 40 having a width "x" and a length "y."

Figure 2:
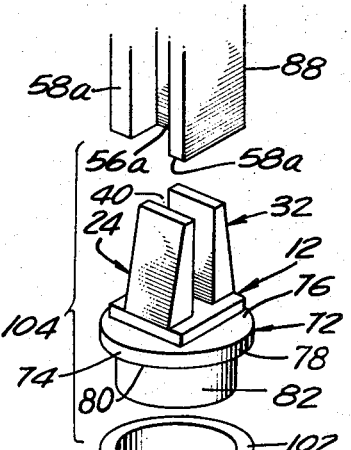
FIGURE 2 is a perspective view of a second type of connecting means shown in exploded assembly with the two columns associated therewith.
Figure 2:
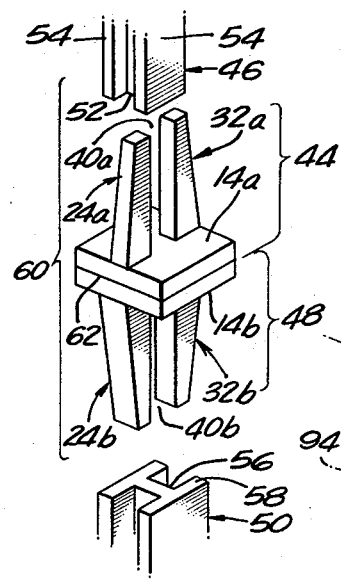

In FIGURE 2, a reference numeral 44 and a reference numeral 48 depict the upper and lower portions of a second type of connecting means shown in exploded perspective with associated structural columns 46 and 50 respectively, having corresponding web portions 52 and 56 and flange portions 54 and 58. It should be noted that by eliminating the extension 20 in FIGURE 1, both the upper and lower portions 44 and 48 respectively are formed. By then arranging them back to back as depicted by a line 62, the portions 44 and 48 can be provided. It should be noted that columns of different sizes can be realistically interconnected in a removable or dissembly manner.

Figure 3:
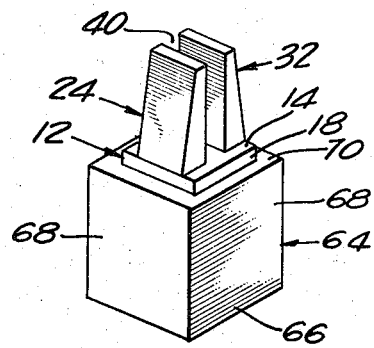
FIGURE 3 is a perspective view of a third type of connecting means.

In FIGURE 3, a third embodiment of a connecting means for the model structural system according to the invention is shown by a reference numeral 64. A block 66 having planar sides 68 and a top surface 70 is provided and suitably connected to the base plate 12 with ribs 24 and 32 extending upwardly from the surface 14 to form a space 40 into which the web portions, such as the web portions 52 and 56 of FIGURE 2, are removably received. In FIGURE 3 as well as FIGURES 4 through 6, like numerals are used to depict like parts or structure.

Figure 5:
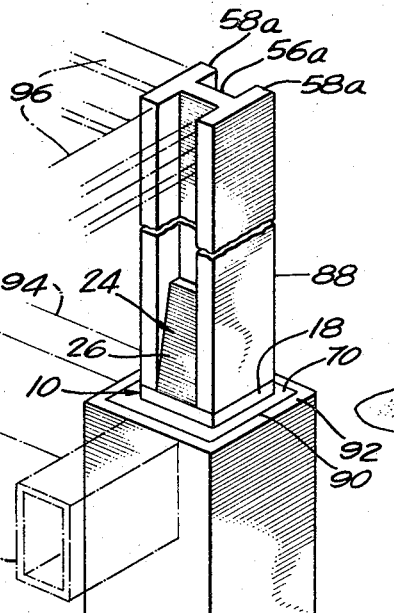
FIGURE 5 is an exploded perspective view showing a fourth type of connecting means and the associated columns removably interconnected.
Figure 6:
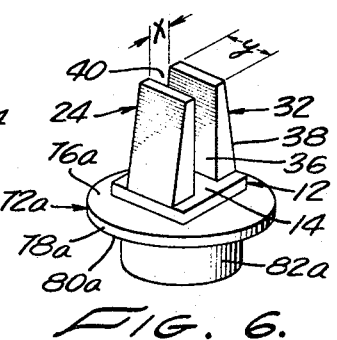
FIGURE 6 is a perspective view of a fifth type of connecting means.

In FIGURE 5, a reference numeral 72 depicts another connecting means of the invention comprising the base plate 12, the ribs 24 and 32 forming the region or space 40, and a cap 74 having an upper circular surface 76, a lip 78, an annularly supporting surface 80 formed by the lip 78, and a cylindrical or curvilinear insert 82. In FIG-6, a similar embodiment is shown by a reference numeral 72a which in all respects is the same as the connecting means 72 except the lip 78a extends radially outwardly for a larger portion to form an outwardly extending surface 76a and annularly supporting surface 80a.

Figure 4:
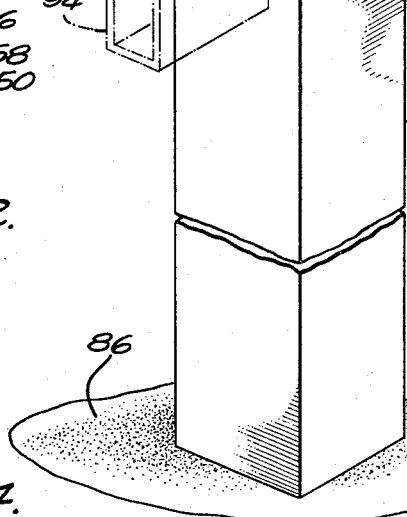
FIGURE 4 is a perspective view of a fireproof column supporting a bare steel column and removably connected together by the connecting means of FIGURE 3.

In FIGURE 4, a fireproof column 84 is shown supported by a surface 86 and in turn supporting an H-column 88. A connecting means 64 is insertedly disposed in the column 84 with the top surface 70 in flush mounting relationship, for example, with an upper edge 92 and intersecting therewith along a line 90. The surfaces 68 of the block 66 may be cemented to the column 84 along the inner surfaces thereof if desired. Similarly, a cemented joint may also be provided if desired at the junction of the planar surfaces 30 and 36 and the web portions 56a as best seen in exploded view in FIGURES 2 and 5.

In FIGURE 1, the side surfaces 30 and 38 as well as the inner planar surfaces 28 and 36 may be cemented to the corresponding inner engaging surfaces of the flanges 54 or 58 and the webs 52 or 56 to form a permanent connection. To permit a removable connection, however, only the gusset-like lower portion 48 in the case of the arrangement of FIGURE 2, or the block 66 in the case of FIGURE 3, or the insert 82 and 82a in the case of FIGURES 5 and 6 would be appropriately bonded to the corersponding supporting columns 50, 84, or 98 respectively.

As seen in FIGURE 5, a supporting column 98, which may be circular or otherwise curved in some curvilinear fashion, includes an opening 100 for receiving the matching insert 82 with the annular supporting surface 80 in support bearing relationship on the edge surface 102 of the column 98. By placing the web portion 56a in FIGURE 5 into the space 40 and the insert 82 into opening 100, the assembly depicted by a reference numeral 104 may be provided.

It should be pointed out that the column 50 of FIGURE 2 may be removably mounted in the space 40 of the connecting means 10 of FIGURE 1 and these in turn may be permanently attached to the surface 86 to provide a model formed of all structural shapes, fireproofing need not be used at all.

It should also be mentioned that the column 84 as seen in FIGURE 4 may be one of a plurality supported by the surface 86 and interconnected by means of fireproof girders and beams 92 and 94. The structural column 88 may also be interconnected with a plurality of such columns by braces, girders, etc. depicted by a reference numeral 96 and, like the fireproof girders and beams 92 and 94, shown in phantom for illustrative purposes only.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent devices and methods.

I claim:

1. In a system for providing an engineering model of a structure, the combination comprising, substantially horizontally base means for said structure;

a first plurality of upstanding elongated structural members mounted to said base means;

a second plurality of upstanding elongated structural members including bracing means for interconnecting the members of said second plurality in spaced apart relationship; and connecting means for removably receiving the members of said second plurality in supporting disposition on the members of said first plurality, said connecting means being secured to the members of said first plurality at the upper end thereof and including a gusset-like upper portion comprising essentially a plate supporting two right triangular members having facing portions parallel to each other for engageably contacting certain portions of the members of said second plurality at the lower end thereof in said removable relationship.

2. The combination in accordance with claim 1 further characterized in that certain ones of the members of the members of said first and second plurality are in vertical alignment relationship with members of said second and said first plurality respectively; and in that said connecting means includes means for removably receiving members of said second plurality other than said certain members thereof.

3. The combination in accordance with claim 1 further characterized in that the members of said first plurality comprise tubular means having an open upper end and a curvilinear cross-sectional configuration including a circle;

in that the members of said second plurality include a flange portion and a web portion; and in that said connecting means further includes a lower insert portion and a plate-like portion disposed between said lower insert portion and said gusset-like upper portion, said tubular means being representative of a fireproof column and adapted to engageably receive said lower insert portion with said plate-like portion engagably contacting said tubular means at said upper end.

4. The combination in accordance with claim 1 further characterized in that the members of said first plurality comprise tubular means having an open upper end and a rectilinear cross-sectional configuration;

in that the members of said second plurality include a flange portion and a web portion; and in that said connecting means further includes a lower insert portion and a plate-like portion disposed between said lower insert portion and said gusset-like portion, said tubular means being representative of a fireproof column and adapted to engagably receive said lower insert portion with said plate-like portion engagably contacting said tubular means at said upper end.

5. The combination in accordance with claim 1 further characterized in that there is provided a base connecting means attachably mounted to said base means at predetermined locations thereon;

in that the members of said first and said second plurality include a flange portion and a web portion representative of load supporting structural members, each of said base connecting means including an upwardly extending gusset-like portion adapted to engagably receive one of the structural members of said first plurality in fixed position relationship therewith; and in that said connecting means further includes a gusset-like lower portion and a plate-like portion disposed between said lower and said upper gusset-like portions, said lower gusset-like portion being mountable on the structural members of said first plurality and in surface contact relationship at the upper ends thereof with the corresponding web and flange portions associated therewith, said upper gusset-like portions being adapted to removably receive the lower ends of the structural members of said second plurality and in surface contact relationship with the associated web and plate portions thereof whereby said second plurality of structural members may be removably disposed in pre-determined assembly relationship from said first plurality.

6. The combination in accordance with claim 5 further characterized in that said structural members include two parallelly disposed flange portions and a web portion coextending therebetween in H-like configuration; and in that said gusset-like portions of said base connecting means and said connecting means include first and second rib plate members having interfacing planar surfaces disposed in predetermined spaced apart relationship along the centerline of said structural members, the web portions thereof being disposed in contact engaging relationship with said planar surfaces for providing a sturdy, removable junction between said first and second plurality.

7. The combination in accordance with claim 6 further characterized in that the structural members of said second plurality are smaller in cross-sectional configuration relative to the structural members of said first plurality; and in that the upper gusset-like portion of said connecting means is smaller and the interfacing planar surfaces are disposed closer to each other relative to the lower gusset-like portions and the plannar surfaces associated therewith to provide a reduced and separatable junction between said first and second plurality.

8. The combination in accordance with claim 5 wherein said base means includes a plurality of substantially vertical openings disposed therein at predetermined locations; and wherein said base connecting means includes a lower threaded portion comprising an extension engagably received in said openings and a plate-like portion connected between said upper gusset-like portion and said lower portion.

9. The combination in accordance with claim 3 further characterized in that said plate-like portion extends radially outwardly from the peripherial surface of said tubular means when disposed in assembled configuration.

References Cited

UNITED STATES PATENTS

| | | | |
|---|---|---|---|
| 1,201,579 | 10/1916 | Hall | 46—29 X |
| 1,426,087 | 8/1922 | Metcalfe. | |
| 1,668,551 | 5/1928 | Crosman | 46—26 |
| 2,146,332 | 2/1939 | Deming | 189—36 |
| 3,168,793 | 2/1965 | Gibson | 46—28 |
| 3,303,581 | 2/1967 | Levinson | 35—16 |

FOREIGN PATENTS

| | | |
|---|---|---|
| 74,205 | 11/1960 | France. |
| 3,291 | 1909 | Great Britain. |
| 447,801 | 5/1936 | Great Britain. |

EUGENE R. CAPOZIO, *Primary Examiner.*

H. S. SKOGQUIST, *Assistant Examiner.*

U.S. Cl. X.R.

46—23, 29, 31